United States Patent [19]
Long et al.

[11] Patent Number: 5,473,402
[45] Date of Patent: Dec. 5, 1995

[54] FILM PROCESSING SYSTEM

[75] Inventors: Francis C. Long, Rochester; Walter C. Slater, Prattsburg; Thomas J. Murray, Leroy; Bradley C. DeCook; Howard C. Bozenhard, both of Rochester, all of N.Y.

[73] Assignee: Eastman Kodak Company, Rochester, N.Y.

[21] Appl. No.: 171,582

[22] Filed: Dec. 22, 1993

[51] Int. Cl.$^6$ ............................. G03D 3/08; G03D 13/00
[52] U.S. Cl. ................ 354/298; 354/313; 354/319; 354/321; 355/40
[58] Field of Search ................... 354/319–323, 354/354, 298; 355/27–29, 40, 41

[56] References Cited

U.S. PATENT DOCUMENTS

| | | | |
|---|---|---|---|
| 4,574,692 | 3/1986 | Wahli | 355/40 |
| 4,967,222 | 10/1990 | Nitsch | 354/321 |
| 5,041,853 | 8/1991 | Kiejzik | 354/317 X |
| 5,093,686 | 3/1992 | Shigaki | 355/77 |
| 5,119,126 | 6/1992 | Tokuda | 355/41 |
| 5,157,439 | 10/1992 | Sakamto et al. | 355/28 |
| 5,191,371 | 3/1993 | Shigaki | 354/275 |
| 5,227,823 | 7/1993 | Shigaki | 354/106 |
| 5,227,827 | 7/1993 | Murakami | 354/333 |
| 5,229,802 | 7/1993 | Shiota et al. | 354/340 |
| 5,231,439 | 7/1993 | Takahashi et al. | 354/313 |
| 5,281,993 | 1/1994 | Crochetierre et al. | 355/40 |

Primary Examiner—D. Rutledge
Attorney, Agent, or Firm—Peter J. Bilinski

[57] ABSTRACT

A film processing system that removes film strips from their cartridges, splices the strips together for processing and printing, and then separates the strips for return and reattachment to the same cartridge from which they were removed. The empty cartridges are maintained during processing in a magazine in the same sequential order and corresponding batch as the spliced film strips, to facilitate matching of the film strips and cartridges at the end of the process. According to other features, the spliced roll of film strips is unwound and rewound after development, once for electronically scanning the film strips to capture electronic representations of the developed images, and again for optically printing the developed images onto photographic paper. The film strips include magnetically recorded information, representing conditions of camera exposure, that are captured during scanning before printing.

10 Claims, 9 Drawing Sheets

FILM PROCESSING SYSTEM

CROSS-REFERENCE TO RELATED APPLICATIONS

Reference is made to the following commonly assigned copending U.S. patent applications, the disclosures of which hereby are incorporated by reference into the present specification:

Ser. No. 08/098,112, Entitled A Tool And Method For Detaching A Trailing End Portion Of A Filmstrip From At Least One Hook Atop A Ramp On A Film Spool Inside A Film Cartridge, filed Jul. 27, 1993, in the names of Thomas C. Merle, Dale W. Ryan and David L. Rowden.

U.S. Pat. No. 5,373,339, Entitled Apparatus and Method for Separating Spliced Strips of Photographic Film, issued Dec. 13, 1994 in the names of William J. Greene, John A. Romansky and Randall R. Maysick;

Ser. No. 08/172,013, Entitled Film Cartridge Magazine, filed on even date herewith in the names of Dennis F. Tianello, Alfonso Ianni, John A. Romansky, Gerald F. Sherman Jr., William T. Matthias and Ralph E. Williams;

Ser. No. 08/171,013, Entitled Method and Apparatus for Attaching Or Detaching a Film Strip to a Film Cartridge, filed on even date herewith in the names of Thomas C. Merle and Dale W. Ryan.

BACKGROUND OF THE INVENTION

1. Field of Invention

The invention relates to photofinishing operations, and more specifically to methods and apparatus for tracking and processing photographic materials and associated information in such operations.

2. Description of the Prior Art

In a typical photofinishing operation, individual rolls of photographic film are removed from their containing cartridges and spliced together to facilitate development and printing. The cartridges are broken open and discarded. The film is removed from the cartridges and the resulting film strips are spliced together, end-to-end, to form a larger roll that is easier to handle with automated equipment. The spliced film roll is unwound and rewound several times as it is run through film development and paper printing stations. Near the end of the process, the spliced film roll is cut into strips again, corresponding in some whole number to the customer order, and is matched with the prints for return to the customer.

Information required for processing is retrieved in two different operations. The first is a manual sorting step at the beginning of the process that uses product information and customer instructions delivered to the photofinisher with the processing order. The film is manually sorted into batches according to the required parameters for film development and paper printing. The second is in the printer itself, after the film is developed. The printer scans the developed images on the film to determine and set printing parameters such as transfer densities and color corrections.

Photographic processes have been proposed in which the film is retained in its cartridge throughout the processing operation. The cartridges typically are handled by conveyers that transport the cartridges between and through the various processing steps. The film is pulled or otherwise extended from its cartridge, operated on in one station, and rewound back into the cartridge for movement to the next station. This continues until processing is complete and the film, still in its cartridge, is matched with the prints and returned to the customer. Examples of this approach are disclosed in Shigaki U.S. Pat. No. 5,093,686, issued Mar. 3, 1992, and Takahashi U.S. Pat. No. 5,231,439, issued Jul. 27, 1993.

Still other approaches have been proposed in which the film is removed from its cartridge for development and printing, but then is reloaded into a similar cartridge for return with the prints to the customer. The two patents cited in the paragraph above also describe this approach.

PROBLEM SOLVED BY THE INVENTION

Typical processing operations destroy the cartridge when the film is removed, creating waste and discarding a useful film container. The film is then returned to the customer after processing in short strips that frequently are lost and almost always are difficult to retrieve and rematch with the corresponding paper prints.

Printing information, such as transfer density and color correction, are determined on-line in the printer. Throughput then depends on the slowest operation. When full image scanning and index printing are added, buffering is required to accommodate the mismatch between the printing rates.

Prior art processes that save the cartridge for later use have not provided efficient mechanisms for handling the cartridges and maintaining desired linkages between cartridges and other photographic materials and information.

SUMMARY OF THE INVENTION

The invention is directed to overcoming one or more of the problems set forth above. Briefly summarized, according to one aspect of the invention, photographic film strips are removed from their cartridges and spliced together, end-to-end, establishing a sequential order of the film strips. The film strips are processed and printed in sequential order, either forward or reverse, and then separated by desplicing for return and reattachment to the same cartridge from which they were removed. The empty cartridges are maintained during processing in a cartridge magazine in the same sequential order and corresponding batch as the spliced film strips, to facilitate matching of the film strips and cartridges at the end of the process.

According to other features of the invention, the spliced roll of film strips is unwound and rewound after development, once for electronically scanning the film strips to capture electronic representations of the developed images, and again for optically printing the developed images onto photographic paper. In connection with more specific aspects of this feature, the film strips include magnetically recorded information, representing conditions of camera exposure, that are captured during scanning before printing. Still other aspects of this feature use the electronically scanned image information to generate index prints, each including a plurality of images printed in a small format on a single rectangular sheet.

ADVANTAGEOUS EFFECTS OF THE INVENTION

The invention provides processing methods and apparatus for efficient handling of film, cartridges, prints and other processing materials and information. Film strips are removed from their cartridges and spliced into large rolls convenient for processing in solutions. The cartridges are maintained in batching magazines in the same order as the spliced film strips, and are used again when the film strips are separated and reloaded into the cartridges near the end of the process. Waste is minimized, and the cartridge provides a particularly convenient package for storing the film.

The process segregates scanning of the film from the printing operations. Index printing can be included, using scanned image information, without reducing the speed or requiring undesirable buffering in the service printer.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 4–8 are schematic views representing one of the stations in the photofinishing operation for detaching and removing film strips from their cartridges.

FIGS. 9–12 depict a cartridge magazine for maintaining the film cartridges in sequential order according to a feature of the invention.

FIGS. 14–18 are schematic representations of a desplicer, still another of the photofinishing stations according to the invention.

FIGS. 19–22 are schematic representations of a reattaching device for reloading a cartridge with the same film strip it contained before the processing operation.

DESCRIPTION OF THE PREFERRED EMBODIMENTS

Figure 1:
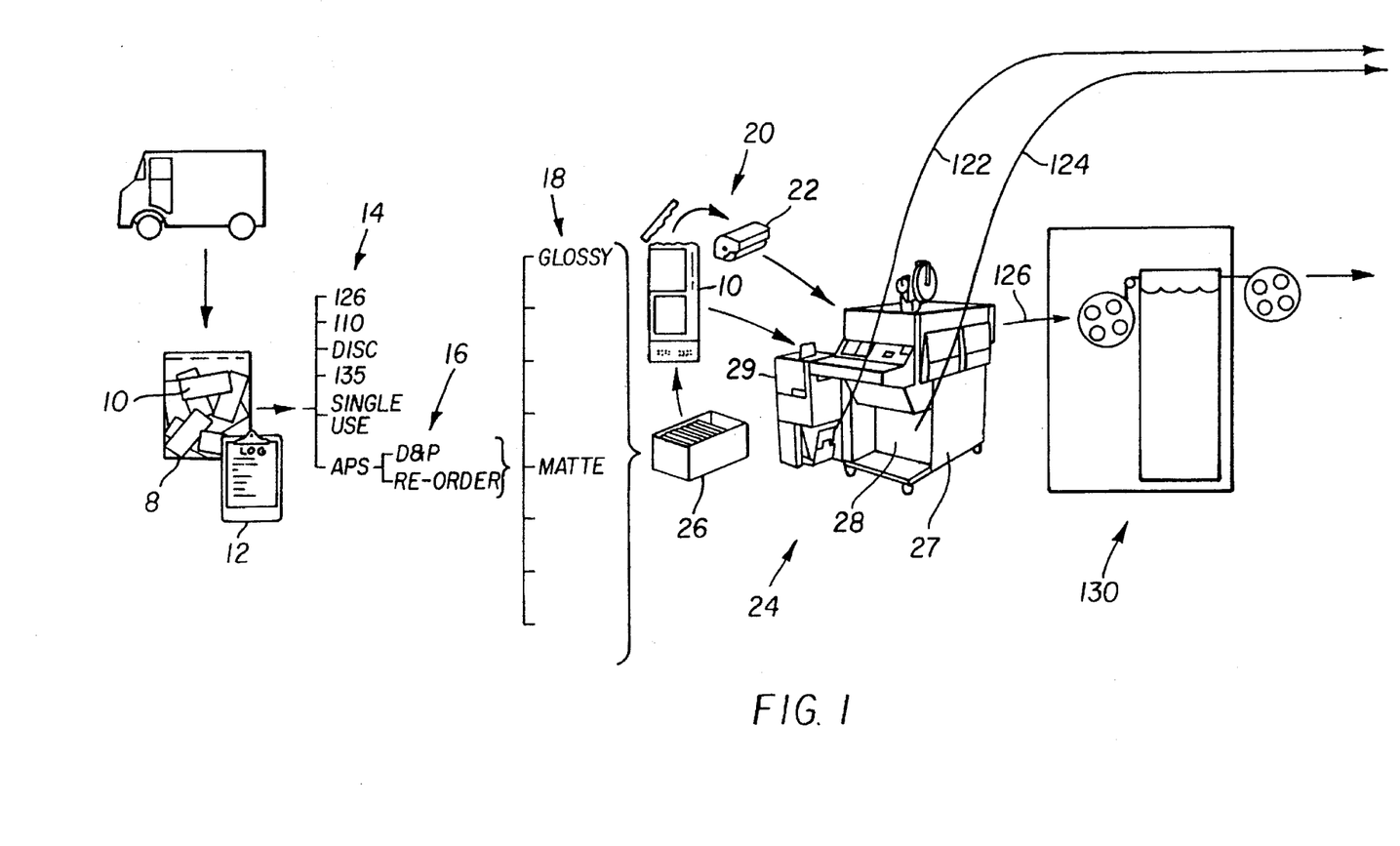
FIGS. 1–3 are schematic views that together represent a photofinishing operation according to a preferred embodiment of the invention.

Referring now to a preferred embodiment of the invention, and beginning with FIG. 1, film is delivered to the processing facility in bins or bags 8, each representing a dealer, postal accumulation, or the like, and containing many individual customer orders. The individual orders are represented by envelopes 10 that contain one or more rolls of film, usually in cartridges, and include product identification and instructions from the customer for processing. Even before the envelopes are opened, the orders are logged in at 12 and sorted according to the product and customer instructions on the envelope 10.

Rough and Fine Sort

The film is sorted first by product format and priority. As depicted at 14, product formats might include film from single use cameras, disc film, or strip film in sizes 110, 126, 135, or APS. The invention has particular utility and will be described in connection with the APS format, which will be characterized more fully hereinafter.

A second sort establishes film batches by the service requested, as depicted at 16. Services include: a) developing and printing (D&P) for first time service; and b) re-orders for additional prints, enlargements and the like. The preferred embodiment is described here in connection with orders for first time development and printing (D&P). For purposes of simplicity, reorders and makeovers are not part of this description.

Still another sort, depicted at 18, is by print surface, print size and the quantity or number of prints requested. These parameters are most pertinent to the properties of the photographic paper, and the volume of paper used in the printing operation.

At the end of this rough and fine sorting process the film rolls are isolated into batches having common characteristics or required parameters for processing and printing. In addition, each batch is assigned a local product code (LPC) identifying features of the batch and information used for subsequent billing.

The envelopes 10 are opened at 20, the cartridges 22 are removed and the envelopes and cartridges are loaded into a film splicing station 24. A machine readable cartridge identification (CID) is captured and printed on the envelope, and the empty envelopes are replaced in a tote or box 26 in the same order the cartridges 22 entered the splicer 24. The sequential order of the envelopes 10, the cartridges 22, and the film strips are retained throughout the process, but may be reversed, front-to-back, at various stages in the process. Unless otherwise specified, the phrases forward sequence or forward order refer to the order when the film strips are first spliced together. The terms sequence and order, when not modified by forward or reverse, include both the forward and reverse directions.

Envelopes 10 in box 26 are retained in sequential order for later retrieval from the front of the box when desired in forward order, or the back of the box, when desired in reverse order.

APS Film Format

The film format used in this preferred embodiment is a roll of strip film contained in a cartridge somewhat similar to existing products often referred to as the thirty five millimeter (35 mm) format. It differs, however, in a number of respects including a magnetic coating on the film surface suitable for use in a camera to record parameters of the camera exposure. This feature is sometimes referred to as magnetics-on-film (MOF), and is provided for recording the flash setting and other exposure conditions. More importantly, the magnetically-recorded information preferably identifies the desired print format as regular or panoramic. The print format is selected through the camera when the film is exposed, and must be identified later, when the film is processed, to match the desired image format with the proper printing optics and frames. Of course some cameras may not have magnetic recording capability. In such cameras the image format information typically will be recorded optically on the film. When optically recorded, the image format information, e.g. regular or panoramic, is represented by the presence or absence of an exposed film area called a FAT bit. Several issued U.S. patents include descriptions of film having a suitable magnetic coating for the purposes mentioned above. Examples include U.S. Pat. Nos. 5,021,283, issued Jun. 4, 1991 and No. 5,025,283, issued Jun. 18, 1991.

The APS format differs also in a capability provided for removing the film from its cartridge without damaging the film or the cartridge, and a related capability for loading the film back into the very same cartridge from which it was removed. These capabilities are described more fully in the above-referenced U.S. patent applications Ser. Nos. 08/098,112 and 08/171,790.

Still another feature of the APS format is a mark, preferably a perforation, associated with each picture frame for identifying its location on the film strip.

Film Detaching and Splicing

The splicing station has four sections: a) it reads the cartridge identification (CID) and prints it with a local product code (LPC) on the envelope; b) it detaches and removes the film from its cartridge without damaging the film or the cartridge; c) it splices the removed film strips into larger rolls defining film batches, and d) it loads the empty cartridges into a cartridge magazine in the same sequential order as the spliced film strips.

Reading and printing the cartridge identification (CID) and local product code (LPC) were mentioned above. The splicing section 27 is conventional, and will not be described in this specification. Commercial equipment sold under the name "Gretag Imaging Ultimax" is but one example. The cartridge loading section 28 will be described in the next section of this specification. The detaching section 29 is described in this section, referring to FIGS. 4–8. The description is relatively brief, however, since a more complete description is included in the above-referenced U.S. patent application Ser. No. 08/098,112, filed Jul. 27, 1993.

The film cartridges 22 are loaded into the splicer 24 in a delivery chute 30 (FIG. 4) that maintains the cartridges in the same sequential order the cartridges were removed from their envelopes 10 and the envelopes are stacked in the box 26. The cartridges 22 then move sequentially to the film detaching station 29 represented by FIG. 5.

Figures 4, 5, 6, 7:
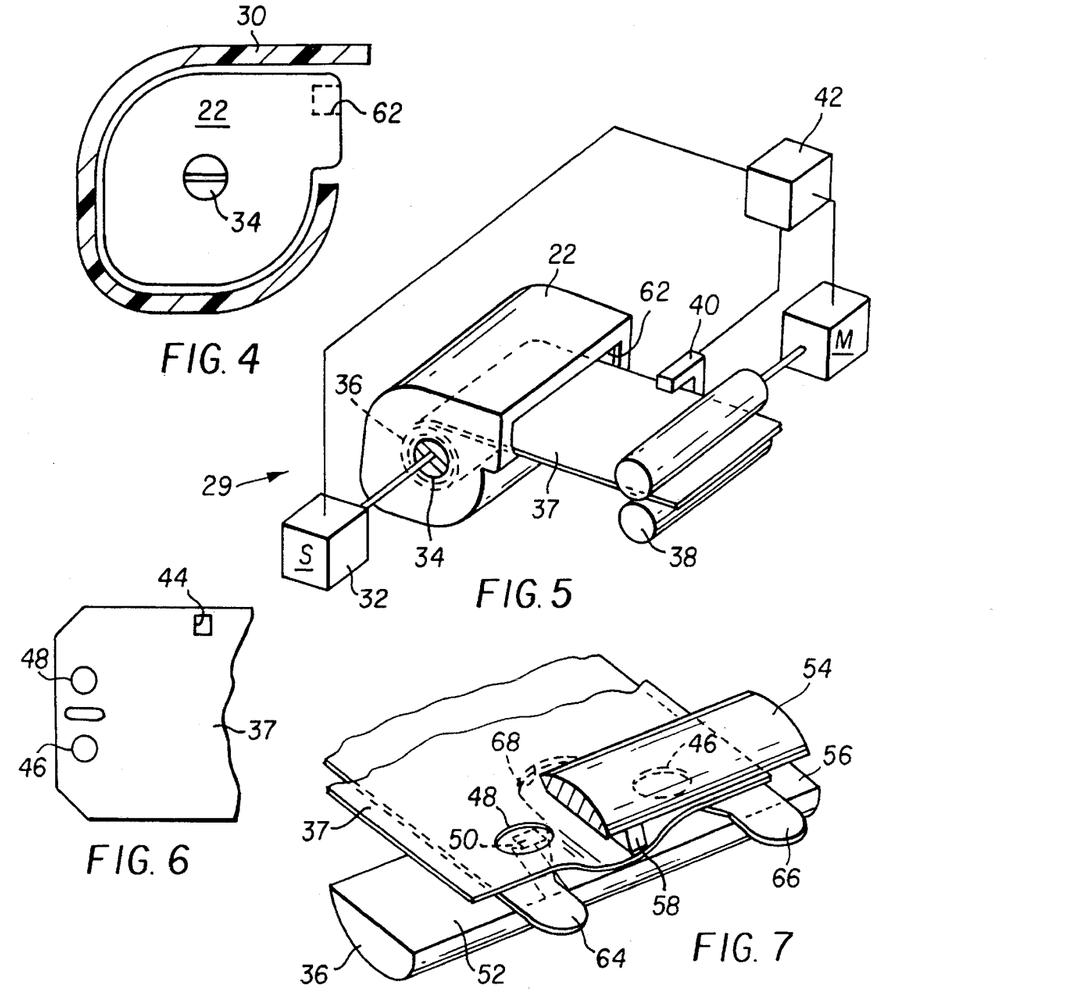
FIG. 4 is an end view of a film cartridge in a chute in cross section to reveal the cartridge.
FIG. 5 represents the detaching station, and depicts a cartridge with the film being removed.
FIG. 6 depicts the trailing end of the film strip and its features that attach the film strip to the cartridge.
FIG. 7 shows a detaching tool that engages the trailing end of the film strip to remove it from hooks in the cartridge.

A stepper motor 32 engages and rotates an accessible portion 34 of the cartridge spool 36 until the leading end of the film 37 is pushed into a film drive 38. The film drive pulls the film from the cartridge and directs the film to the splicing station 27, mentioned above. A sensing device 40 and control 42 watch for the trailing end of the film, identified by a film notch 44, and stop the drive 38 when the notch 44 is positioned under the sensor 40.

The trailing end of the film 37 includes two apertures 46 and 48 that are captured over corresponding hooks 50 on cartridge spool 36. The spool includes a slot 52 defined between upper and lower semi-circular sections 54 and 56, respectively. The trailing end of the film 37 is threaded into the slot 52, between the upper and lower sections 54 and 56, and over the hooks 50. Extensions 58 flex the film slightly between the hooks and exert a bias urging the film toward spool section 54 and into position with the apertures engaging the base of the hooks.

Figure 8:
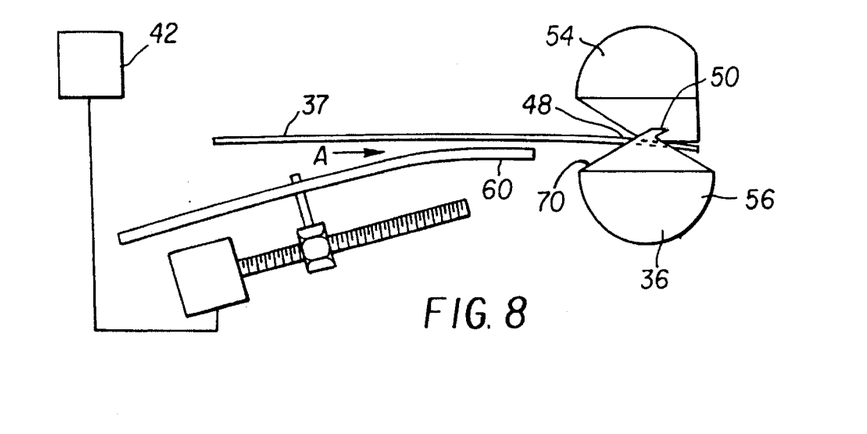
FIG. 8 depicts the operation of the tool illustrated in FIG. 7.
Figure 9:
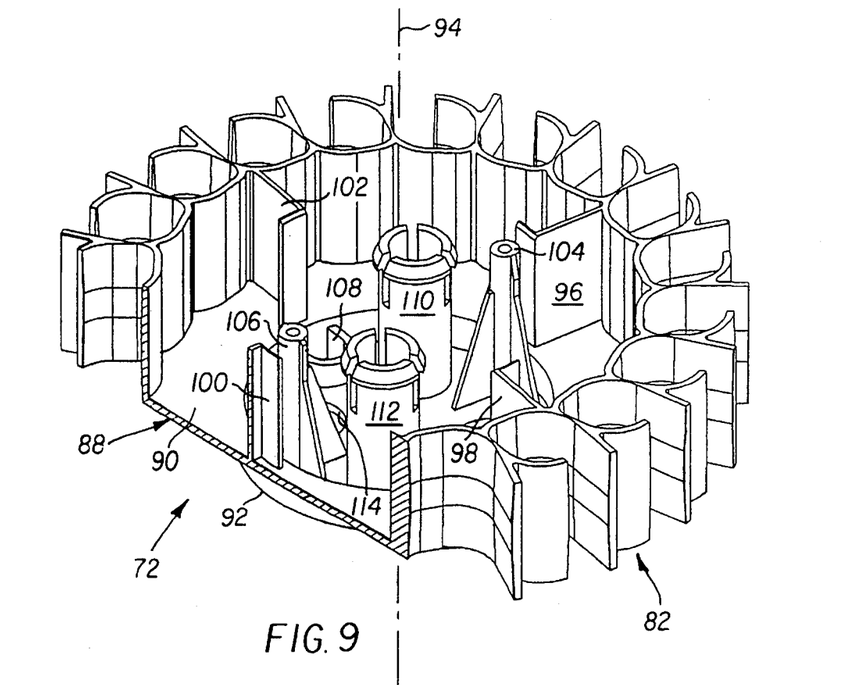
FIG. 9 is a perspective view of one section of the magazine.
Figure 10:
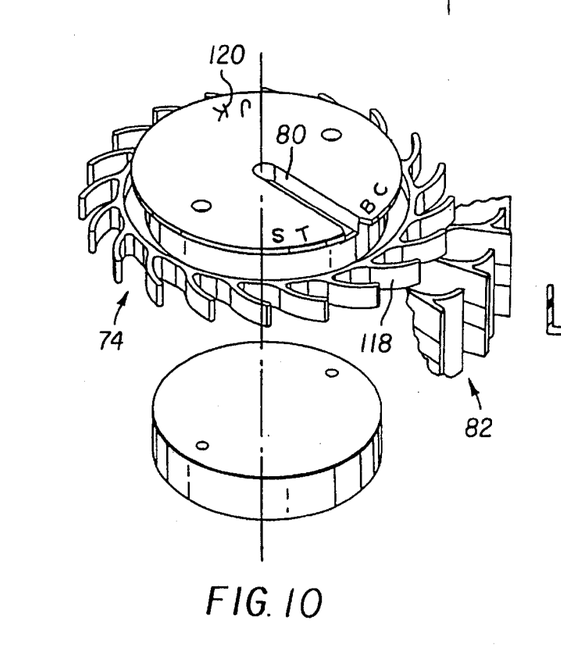
FIGS. 10 and 11 illustrate parts of the magazine in more detail.
Figure 11:
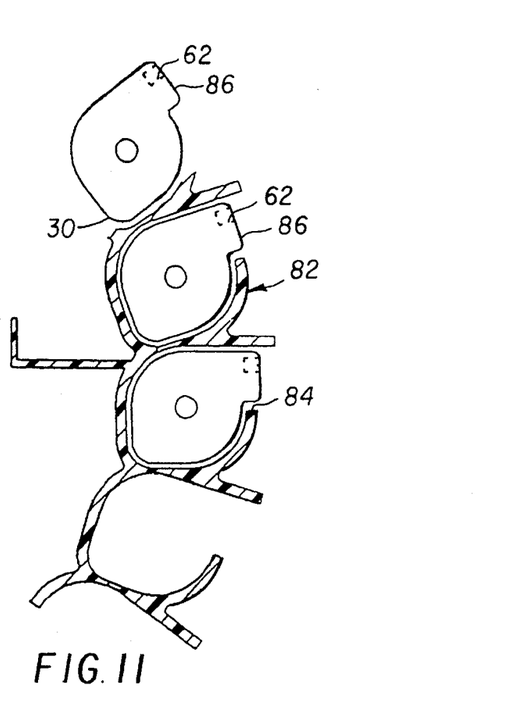

When the film is to be detached or separated from the cartridge, a flexible tool 60 is moved into the cartridge through film conduit 62 (FIG. 4). The tool has a special configuration, including two rounded end sections 64 and 66 separated by an open center section 68. In operation, the tool 60 moves into the cartridge 22, through the conduit 62, and into engagement with the spool 36 between the film 37 and the lower spool section 56. The tool then rides up the ramped side 70 of the hooks 50, between the film 37 and the hooks 50, and pushes the film 37 off of the hooks 50 to release the film from the spool 36 without damaging the film or the cartridge. The open center section 68 of the tool accommodates spool extensions 58 so the tool end sections 64 and 66 will straddle the extensions 58 without interference.

The drive 38 is then operated again to advance the film to the splicing section where the leading end is spliced to the previous film strip. The detaching tool 60 is retracted from the cartridge just emptied of film, and the cartridge is moved along the chute 30 to the cartridge magazine, described next.

Cartridge Magazine

Figure 12:
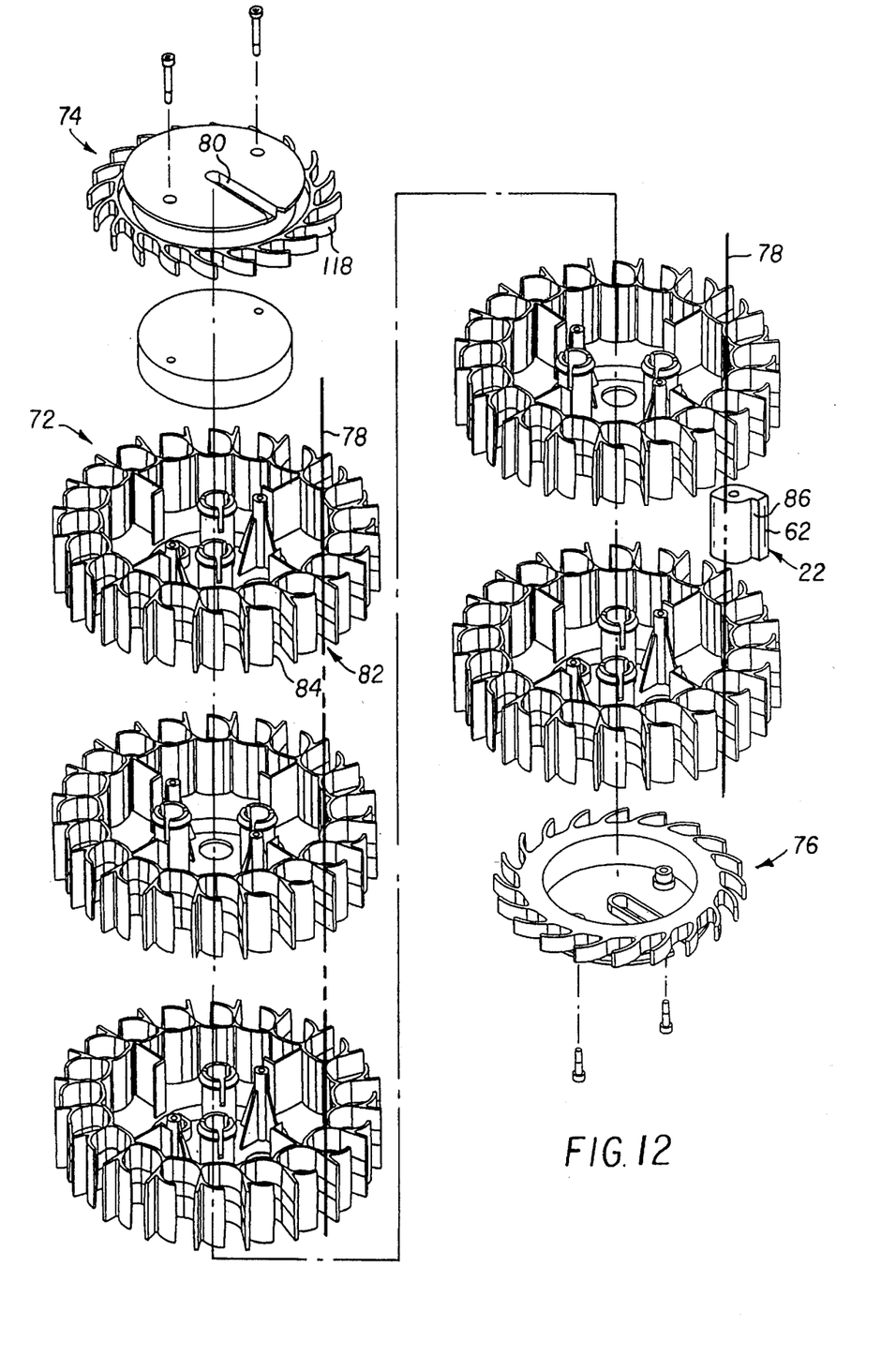
FIG. 12 is an exploded view showing a magazine of five sections including caps on both ends.

The cartridge magazine, depicted in FIGS. 9–12, includes a plurality of identical sections 72 stacked on top of one another in layers between end caps 74 and 76. FIG. 12 illustrates five such layers, with end caps, that define a plurality of columns 78 for receiving the empty cartridges 22. The cartridges are loaded into the magazine from one end, corresponding to end cap 74, completely filling one column in forward sequential order, and then successively fill adjacent columns. The cartridges are maintained in sequential order in the magazine until retrieved some time later. Retrieval can be in the same forward order the cartridges were loaded into the magazine, or in a reverse order. In the forward order the cartridges are dispensed from the other end of the magazine, corresponding to end cap 76, starting with the column first loaded. When retrieved in the reverse order, the cartridges are dispensed from the same end of the magazine in which they were loaded, starting with the last column and working back toward the first. The first column represents a home position and is identified by a slot 80 in the end caps.

When fully loaded, the cartridge magazine is intended to contain one or several batches, but only complete batches, corresponding to the sorted and spliced film batches and the envelope batches mentioned above.

A more complete description of the cartridge magazine is included in the above referenced patent application Ser. No. 08/172,013 (Film Cartridge Magazine), filed on even date herewith. Briefly, however, the columns 78 are defined by sleeves 82, open at both ends and adapted to accommodate longitudinal movement of the cartridges 22, between and through the sleeves, while preventing rotational movement of the cartridges in the sleeves. The sleeves 82 thus align the cartridges in predetermined positions and orientations relative to the rest of the magazine and its homing position.

The sleeves 82 are open along one side at a slot 84, for accommodating the cartridge snout 86 and providing mechanical and visible access through the sleeve to the film conduit 62. The sleeves 82 are transparent, permitting manual and automated reading of information, such as the cartridge identification, on either or both sides of the cartridge snout 86.

The sleeves are supported on a core 88 including a web 90 that supports the sleeves 82 parallel to one another in a circle or ring with the open or slotted side 84 of each sleeve 82 facing away from the center of the ring. An outer hub 92, extends from the web and defines a longitudinal axis 94 at its center. The hub 92 is in the shape of a disk, and is displaced out of the plane of the web 90 in the center of the sleeve ring.

The hub 66 is adapted for capture between four upstanding ribs 96, 98, 100 and 102 of a next adjacent section 72, aligning the sections radially. Pins 104 and 106 are adapted for receipt in radial slots 108 (FIG. 9) to prevent relative rotational movement between the sections. Bayonets 110 and 112 are adapted for receipt in collars 114. The ends of the bayonets include flexible extensions that snap into the collars to provide an axial force pulling the sections together. The magazine sections are aligned for stacking by rotating one ninety degrees relative to the other and pushing the sections toward each other until they snap together.

The end caps include flexible fingers 118 that extend from the end caps to act as gates partially blocking the ends of the sleeves. The fingers are moveable by flexing, either manually or with associated equipment, between a position blocking the sleeves for containing the cartridges, and a position opening the sleeves for loading or dispensing the cartridges. A cartridge escape mechanism (not shown) may be used for releasing the cartridges one at a time when a selected one of the gates is open. Letters 120 (FIG. 10) are embossed in the end caps for identifying each column.

From the splicer 24, the batched envelopes 26 and batched cartridges 121 (FIG. 3), follow paths 122 and 124, respectively, to the desplicing and finishing stations 126 and 128, while the spliced film strips move to a cine processor 130.

Film Processing

The cine film processor 130 is a conventional design and may be selected from a number of commercially available products for developing latent film images into printable images.

Although not depicted on the drawings, the spliced film may be inspected before processing, particularly for splice integrity, and one or more spliced batches may be combined into larger batches for processing. Similarly, after processing, the larger batches may be broken down again for printing in batches of the original size. Still, however, the original batches remain identifiable as they were established during sorting.

Film Preparation Workstation

Figure 2:
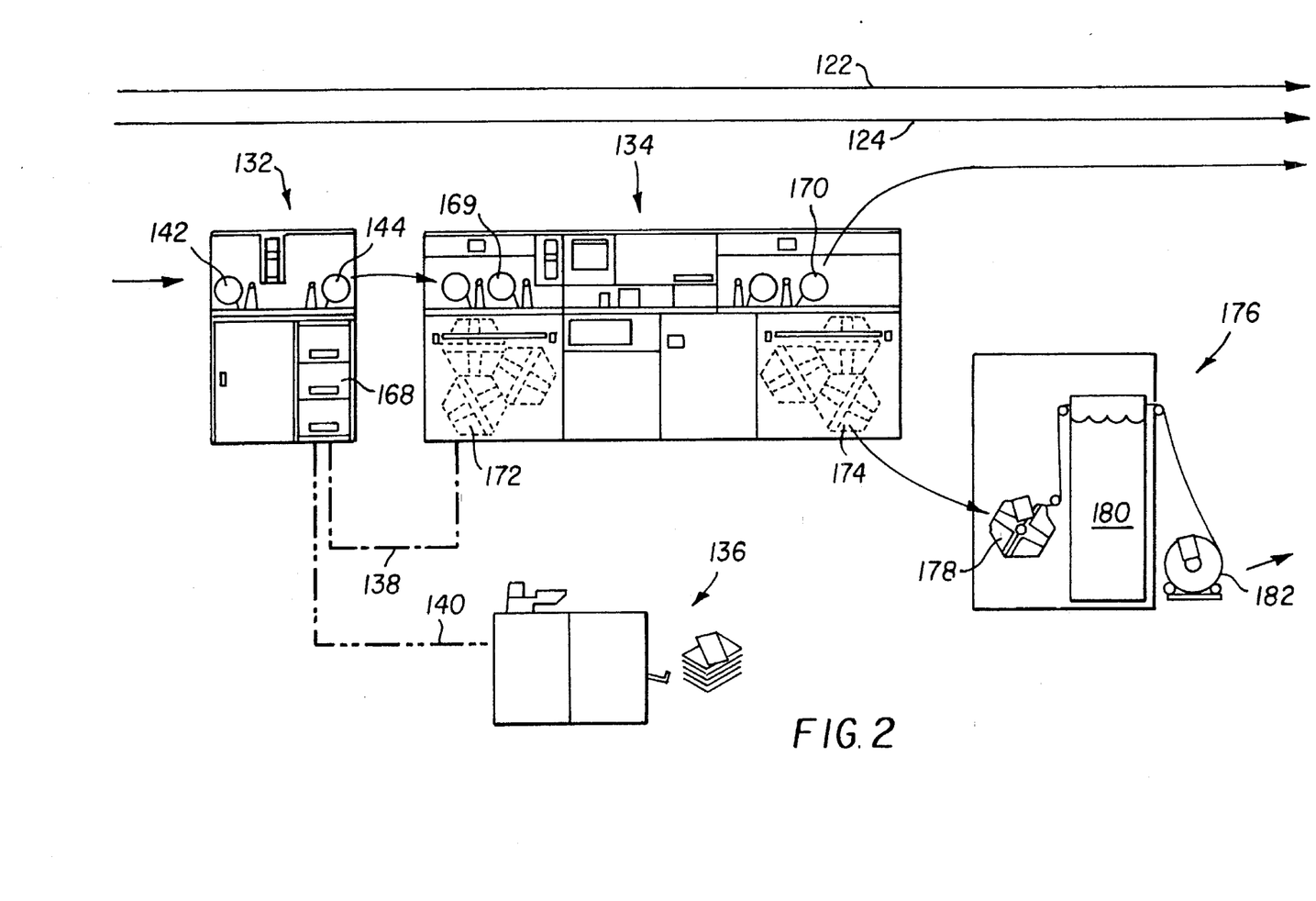
Figure 13:
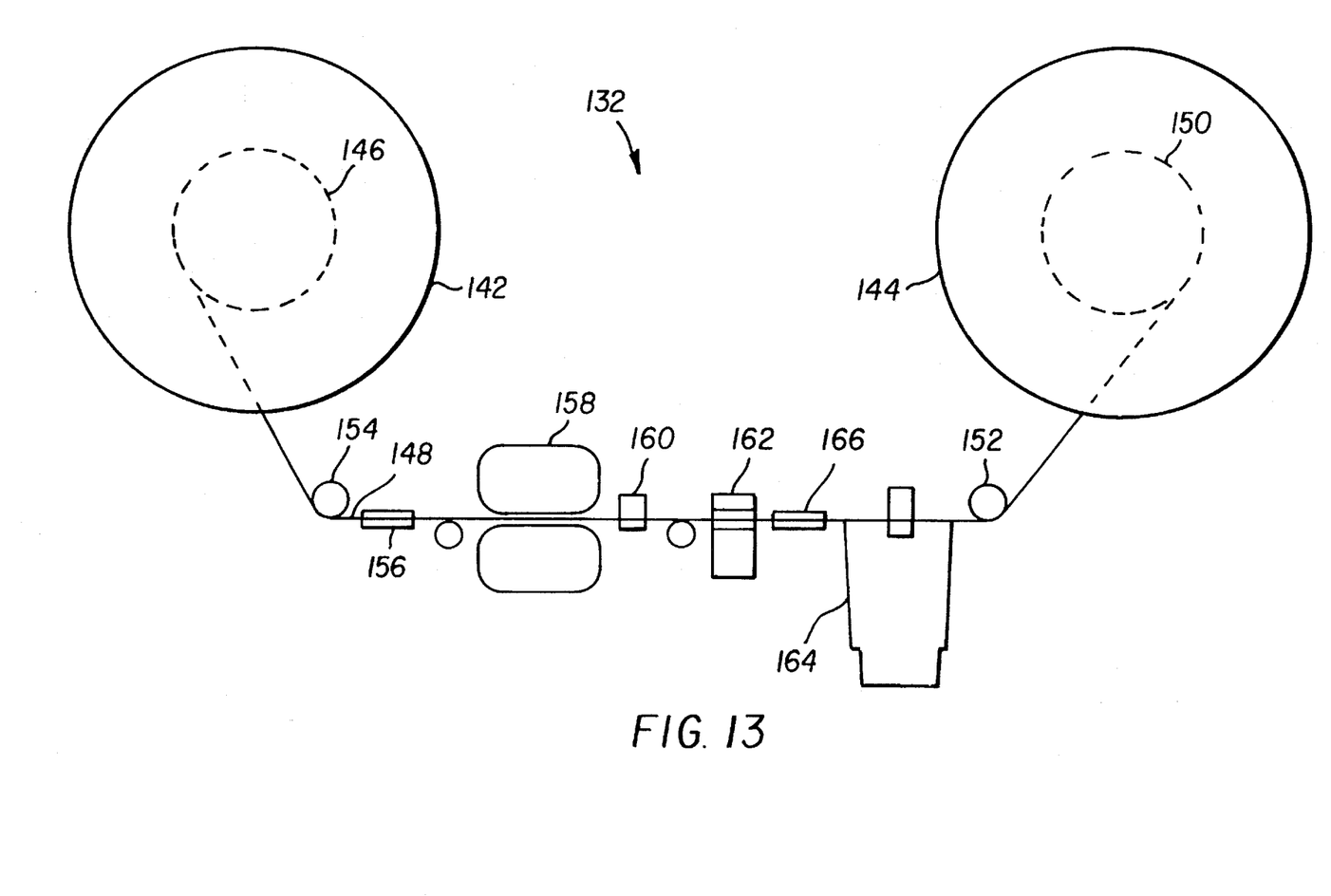
FIG. 13 is a schematic representation of another photofinishing station referred to as a film preparation work station and including scanning functions according to a preferred embodiment of the invention.

After the film is developed, it moves to a film preparation work station 132 (FIGS. 2 and 13). The work station 132 checks splice integrity, cleans the film and electronically scans the film to capture information used during the printing of both service prints and index prints. The work station is mechanically independent of the service and index printers, 134 and 136 (FIG. 2), respectively, which are mechanically independent of each other, so slower operations, such as index printing, will not bog down faster operations, such as service printing. Electronically, the work station is coupled to the service printer through an ethernet connection 138 and to the index printer through a SCSI connection 140. Information also can be exchanged on magnetic media.

The work station 132 is depicted most clearly in FIG. 13, and includes supply and take-up positions 142 and 144, respectively, including appropriate drives and drags for removing slack and maintaining slight tension at the beginning and end of the film line.

Film is unwound from its spliced roll 146 at supply position 142, moves along a substantially straight line path 148, through a series of operating stations, and is wound up again into a reverse roll 150 at take-up position 144. A metering roller 152 pulls the film along the straight line path around a capstan 154 and through the operating stations at a constant and controlled speed.

The first station after roller 154 is a splice detector 156 that checks the integrity of the splices between the film strips. Next is a film cleaner 158, followed by electronic scanning devices 160, 162 and 164, that read or capture information from the film. A second splice detector 166 is positioned in this same series for rechecking the splice after cleaning.

The first electronic device 160 is an optical transducer called a film code reader (FCR). It captures a film identification (FID) that is applied as a latent image bar code (LIBC) when the film is manufactured. This latent image code is developed in the film processor 130, after which it is machine readable. The film identification is the same as the cartridge identification (CID), also applied as a machine readable bar code at the time of manufacture. The film identification (FID) captured here is printed on the back of each service and index print in subsequent printer operations.

The film code reader (FCR) 160 also identifies the beginning of each film strip, establishes the location of each image frame using the mark or perforation mentioned earlier in connection with the APS format, and looks for a FAT bit as described later in this section.

Device 162 is a magnetic transducer that reads magnetically recorded information from the film. As mentioned previously, some cameras using the APS film format will record magnetic information on the film representing certain exposure conditions. Most important for this description is the image format, regular or panoramic. Knowledge of the image format is required for setting printer parameters, such as a zoom lens setting and image frame.

Some cameras will not have magnetic recording capability. As previously mentioned, image format information in such cameras will be exposed on the film as a latent bit referred to as a FAT bit. The information represented by the presence or absence of a FAT bit is captured in the work station by the previously mentioned film code reader (FCR).

Station 164 includes an opto-electronic transducer for electronically capturing representations of the developed images from the film. The electronic image representations are used to determine appropriate transfer densities and color correction factors for the service printer 134, and for generating index prints in the index printer 136. The station 164 includes an array scanner having sufficient resolution for the purposes mentioned. The scanner views the film through a full width slit while the film is pulled continuously over the slit by metering roller 152.

Information captured by the workstation 132 is recorded on magnetic media in drawer 168 (FIG. 2), for storage and buffering, and is fed to the service and index printers when called by the printers. Appropriate informational relationships are maintained so the captured information can be retrieved by spliced film batch, film strip and individual images, in any sequence requested. The service printer, for example, prints batches in a sequential order that is reversed compared to the workstation. The index printer may use still another printing order, or may even print multiple images simultaneously across the full width of the index recording medium.

Service Printing, Paper Processing and Inspection

Service printing refers to the optical printing of developed images from the film onto photographic paper. The printer 134 is modified as noted below from a conventional design and may be selected from a number of commercially available products. One preferred commercial product is referred to as the Kodak CLAS 35 Printer.

The printer is modified to act on information from the film preparation work station, described above, instead of the usual film scanning systems included in the printer.

The printer is provided with suitable optics, preferably a zoom optical system, and printing frames, for handling the multiple print formats possible with the APS system, e.g. regular and panoramic. The printer selects and positions the appropriate optics and frame in the paper exposure position based on information provided by the film preparation work station.

Film is unwound in the printer from reel 169, printed and rewound onto reel 170. Thus, printing occurs in a sequential order that is reversed compared to the sequence of scanning in workstation 132. Paper from rolls 172 is fed through the printer as required, and taken up on in rolls 174.

A back-printer is included to print the film identification number and possibly other information, such as the frame number, on the back of the paper prints after they are exposed to the film images.

The paper processor 176 also a conventional design and may be selected from a number of commercially available products. The paper is unwound from rolls 178, corresponding to the paper rolls 174, fed through suitable processing solutions 180, and rewound into rolls 182. The roll 182 defines a batch of prints that correspond the film batch created by splicing film strips together in the original sorting operations. Inspection of the prints is completed in the normal manner in station 184 after processing and preparatory to finishing.

Index Printing

Index printer 136 uses the image information captured in the work station for generating index prints, each including a plurality of images corresponding to a film strip and printed in a small format on a single rectangular sheet of photosensitive material. The images are scanned onto the sheet, including the film identification number (FID), developed in the index printer and batched in sequential order similar to the envelopes 10.

Film Desplicing and Reattaching

Referring next to FIGS. 14–21, desplicing and reattaching apparatus is depicted for separating the film strips from the spliced film roll and reloading the strips into the cartridges from which they were removed at the beginning of the process.

The desplicing apparatus 126 will be described briefly in two parts: a) desplicing, and b) reattaching. The desplicing apparatus 200 is described in more detail in the above-referenced U.S. Pat. No. 5,373,339, issued Dec. 13, 1994. The reattaching apparatus 255 is described in more detail in the above-referenced patent application Ser. No. 08/171, 790, also filed on even date herewith.

Desplicing

The preferred desplicing apparatus 200 is depicted in FIGS. 14–18, and includes: a) a heating head 216 and opposed platen 218, that move one relative to the other for capturing and heating the splice 210; b) first and second drives 222 (FIG. 14) and 224, for transporting the film strips in the apparatus and for pulling the strips apart from the heated splice; and, c) a disposable splice pick-up web 226 that advances to carry the removed splices away for subsequent disposal.

Splice 210 is typical of products used by the photofinishing industry today and includes treated paper with a layer of thermal adhesive 228 on one surface. The splice 210 is applied to the film strips 212 and 214 with heat and pressure. The film strips thus are coupled securely together with a longitudinal spacing 230 between the strips for purposes to be described hereinafter.

Head 216 includes a heating shoe 232, ending in a hot plate 234 for engaging and heating the splice uniformly. The shoe 232 reciprocates in the head between a raised position removed from the platen and a lowered position where it will engage a splice supported on the platen.

The head preferably is biased toward the raised position and is moved with air pressure to the lowered position to exert a pressure on the splice 210.

Included in the platen 18, however, is an elongate pressure rod 242, that is supported for both rotation and reciprocation perpendicular to the splice or toward the hot shoe 32. Reciprocation is provided under pressure from an air supply 244 sufficient to overcome the opposed pressure from the hot shoe 232 and raise the shoe slightly away from the platen 218. Raising the hot shoe 232 relieves some of the pressure on the film strips so they can be pulled more easily from the splice, as will be described more fully hereinafter. The pressure rod 242 also serves as a concentrator, focusing the pressure with essentially line contact.

First and second film drives 222 and 224 are bidirectional and serve several functions. First they rotate in the same or forward direction to advance the film strips 212 and 214 into position with the splice 210 between the platen 218 and hot shoe 232. Later, after the splice adhesive is softened, the first and second drives are rotated to pull the two film strips apart in opposite directions, separating the strips from the splice. Finally, the drives 222 and 224 are operated in the same direction again to advance both film strips 212 and 214 through the desplicing station for the next operation in the process. Sensors 246, 248 and 250 determine the position of the film strips 212 and 214 at various times in the cycle for assisting in the control of the apparatus.

Pick-up web 226 is guided by the platen 218 to lie under the splice 210 above the pressure rod 242. The web 226 is advanced incrementally by a drive 252 and is wound into a roll (not shown), for capturing the removed splices as they are removed from the film strips.

Figure 14:
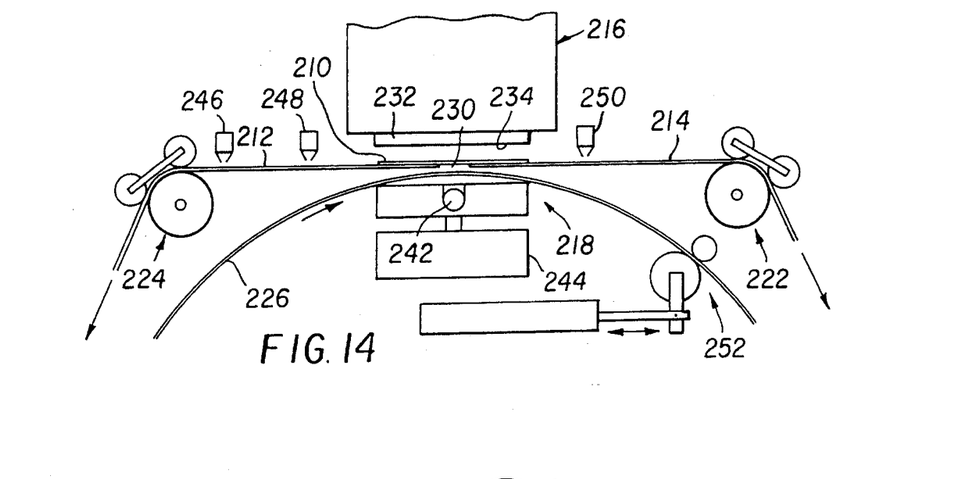
FIG. 14 depicts the various elements of the desplicer.
Figure 15:
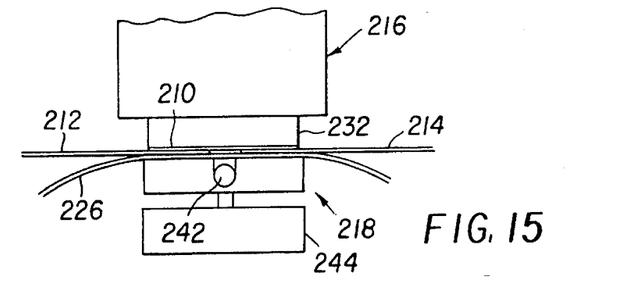
FIGS. 15 and 16 represent its operation.
Figure 16:
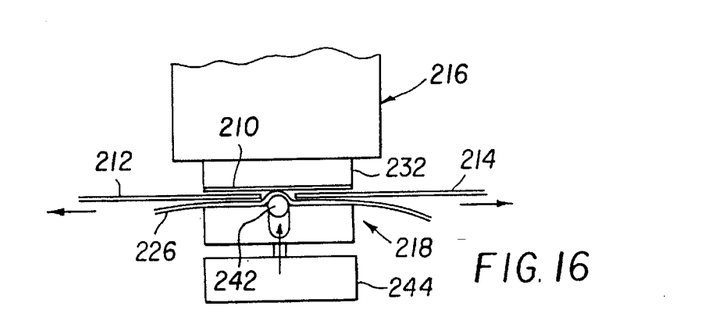
Figure 17:
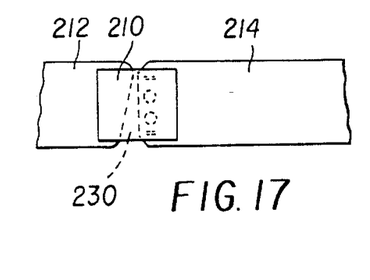
FIGS. 17 and 18 show the film strips before, FIG. 17, and after desplicing.

Referring now to FIGS. 14–16, and to the method of operation, spliced film strips 212 and 214 are advanced into the position depicted in FIG. 14, with the splice 210 between the hot plate 234 and the platen 218. The hot plate 234 is then moved into engagement with the splice 210, under pressure, to conductivly heat the splice adhesive until it softens. After the adhesive is softened, the pressure rod 242 is actuated as depicted in FIG. 16 to engage the splice 210 through web 226 in the space between the film strips. The pressure rod is applied with enough force to raise the hot plate slightly and thereby release some of the pressure exerted on the film strips 212 and 214 by shoe 232. At the same time, the rod 242 captures the splice 210 against the hot plate 234. The film strips 212 and 214 are then pulled apart to separate the strips from the splice and each other.

The pressure rod 242 and hot plate 234 are then lowered again to tack the splice to web 226, and the web is advanced to remove the splice from the area. Eventually, numerous splices will be wound into a roll convenient for disposal.

Figure 18:
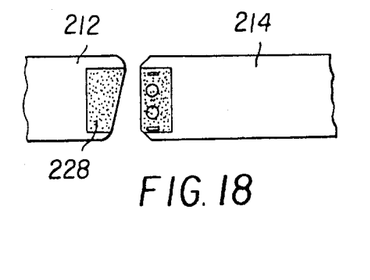
Figure 19:
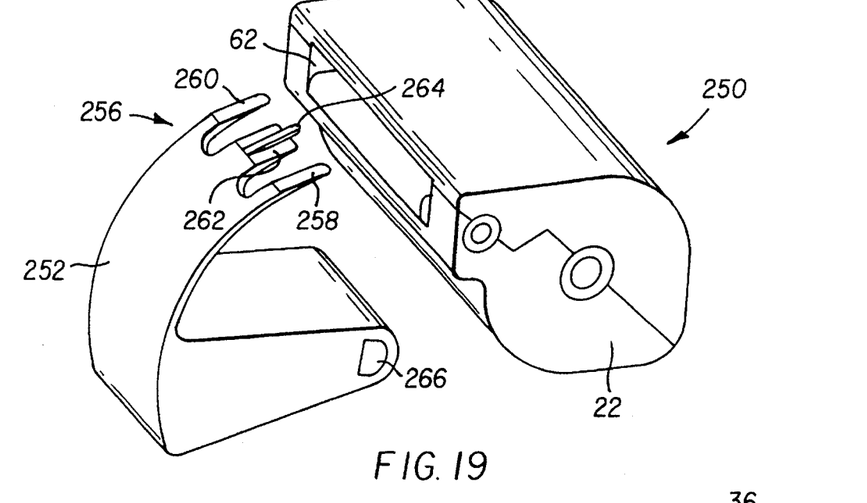
FIG. 19 depicts the cartridge and a reattaching tool.
Figure 20:
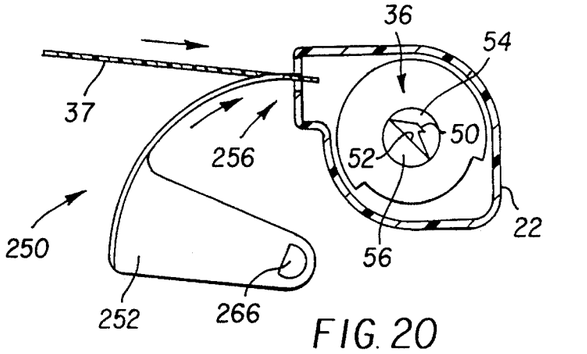
FIGS. 20 and 21 show the operation of the tool to reattach the film strip to the cartridge.
Figure 21:
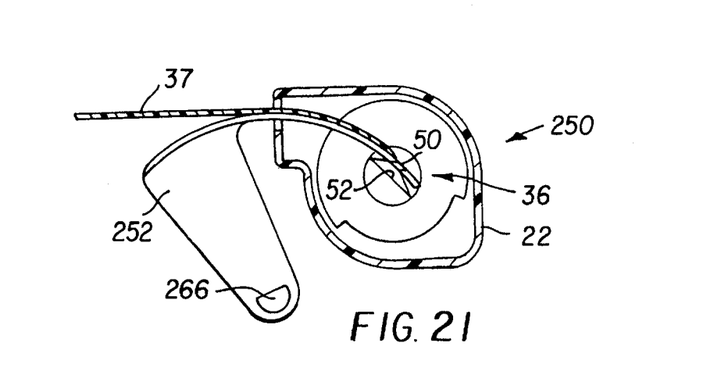
Figure 22:
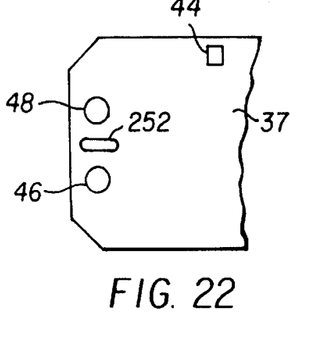
FIG. 22 shows details of the film strip at its trailing end for engaging corresponding attaching elements in the cartridge.

FIG. 18 depicts the two film strips after desplicing. Although some adhesive residue 228 may remain, the film strips are intact, retaining their original configuration from the time of manufacture. No cutting is required.

After desplicing, the film strips are reloaded into the same cartridge from which they were removed, and reattached to the cartridge spool.

Cartridge Reloading and Film Reattaching

Referring now to FIGS. 19–22 film reattaching apparatus 255 is depicted for reloading the film strips into the same cartridge from which they were separated. Pertinent features of the film strip 37 are most clearly shown in FIG. 22, including slot 256. Pertinent features of the cartridge spool 36 are most clearly illustrated in FIGS. 7 and 8, including slot 52 in spool 36 defined between upper and lower semi-circular sections 54 and 56, respectively.

Referring back again to FIGS. 19–21, a reattaching tool 257 includes features 258 adapted for engaging and pulling the trailing end of the film with the tool as the tool rotates into the cartridge through conduit 62. Inside the cartridge the tool 257 and its features 258 move the trailing film end into the slot 52 in spool 36 and over the spool hooks 50. When the tool is withdrawn, the film remains engaged over the spool hooks 50 attached to the cartridge through its spool. Rotation of the spool then winds the film into the cartridge where it is stored for return to the customer.

The features 258 on reattaching tool 257 include three fingers 259, 260 and 262, each defining a flat upper surface for engaging and supporting the trailing end of the film strip. Central finger 262 further includes a projection 264 adapted to enter the film slot 256. The tool is mounted for pivotal movement on a drive shaft 266 between a retracted position depicted in FIG. 19, removed from the cartridge 22, and an inserted position, depicted in FIG. 21, extending into the cartridge and the slot 52 in the spool. When a film strip is engaged through slot 256 by projection 264, pivoting of the tool into the cartridge will pull the film strip with the tool and into the spool slot 52. The film apertures 46 and 48 will slip over hooks 50 and remain attached thereto when the tool is returned to the removed position of FIG. 1.

Finishing and Packaging

Figure 3:
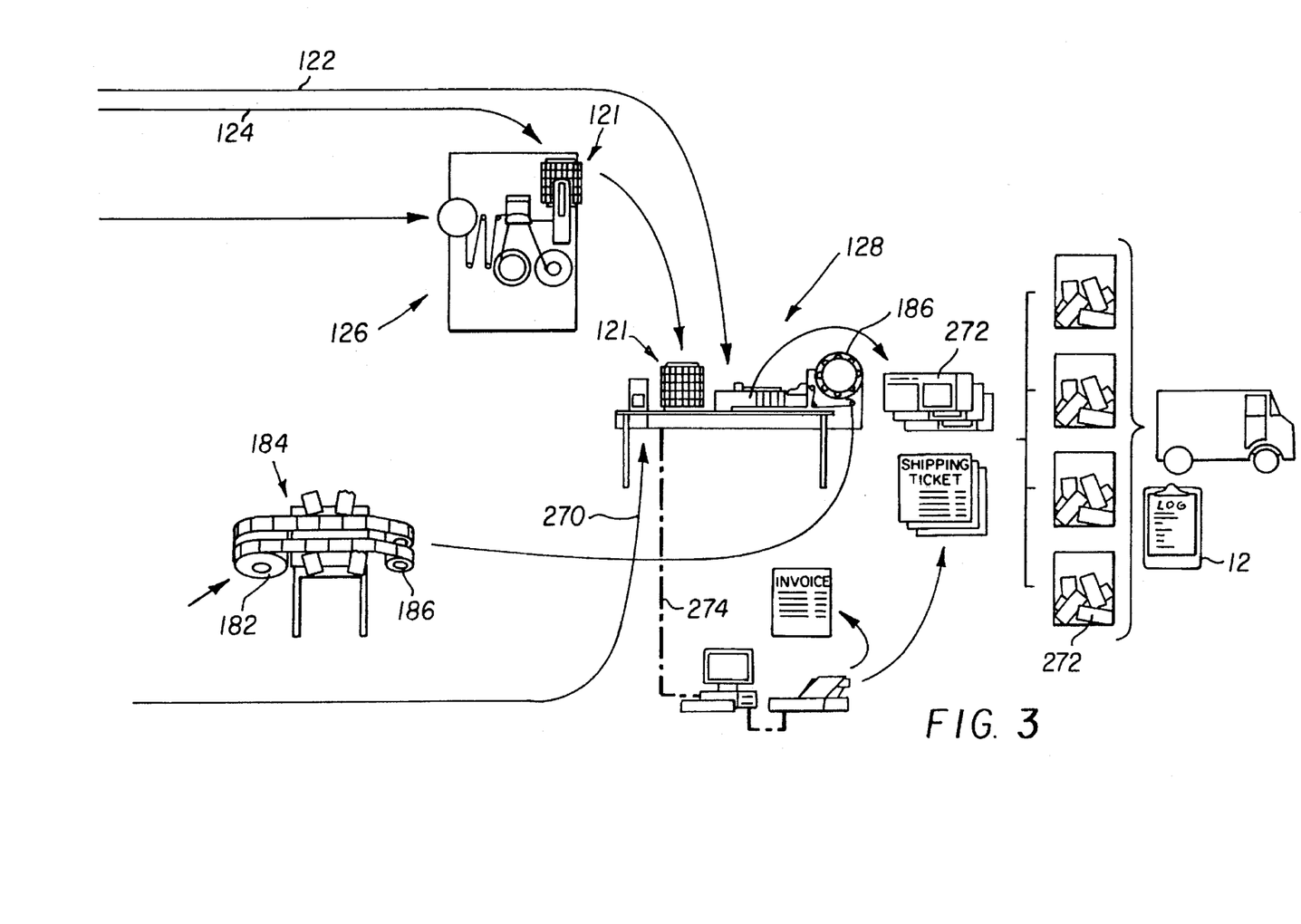

In finishing station 128 the film strips, index prints, envelopes and paper prints all come together as matched batches that are broken down and packaged to complete the customer order. Cartridges including developed film strips are delivered in a cartridge magazine 121 in the same sequential order established when the batch was created. The index prints are delivered in a package along path 270 also in the same sequential order. The envelopes have been retained in order since they were opened, and are moved along path 122 to the finishing station with the corresponding film and index print batches, path 270. The paper 186 is still batched in roll form, and is mounted on the station for cutting and combination with the other elements to establish the completed order. The prints are cut from the paper print roll, a corresponding cartridge is removed from the magazine, the corresponding index print and envelope are retrieved, and all are inserted in a package 272 identifying the customer and any dealer. The order is checked by comparing the cartridge identification (CID) that is on the cartridge and on the envelope with the film identification (FID) that is on the paper and the index prints. The local product code (LPC) is retrieved from the envelope and used at 274 for billing.

In certain photofinishing operations it is possible the paper prints will be in reverse sequential order in the finishing station. In that event the film cartridges, index prints and envelopes easily are retrieved in the same reverse sequence.

While the invention has been described with reference to a preferred embodiment, it will be understood by those skilled in the art that the invention is not limited to the particular details of the embodiment illustrated. The claims are intended to cover all such modifications and applications that do not depart from the true spirit and scope of the invention.

| PARTS LIST FOR FIGURES | |
|---|---|
| Reference No. | Part |
| 8. | Bin. |
| 10. | Envelope. |
| 12. | Log. |
| 14. | First sort. |
| 16. | Second sort. |
| 18. | Third sort. |
| 20. | Envelope opened. |
| 22. | Cartridge removed. |
| 24. | Film splicing station. |
| 26. | Box. |
| 27. | Splicing section. |
| 28. | Cartridge loading section. |
| 29. | Detaching section. |
| 30. | Delivery chute. |
| 32. | Stepper motor. |
| 34. | Accessible portion. |
| 36. | Cartridge spool. |
| 37. | Trailing end of film strip. |
| 38. | Film drive. |
| 40. | Sensing device. |
| 42. | Control. |
| 44. | Film notch. |
| 46. | Aperture. |
| 48. | Aperture. |
| 50. | Hook. |
| 52. | Slot. |
| 54. | Semi-circular section. |
| 56. | Semi-circular section. |
| 58. | Extension. |
| 60. | Flexible tool. |
| 62. | Film conduit. |
| 64. | Rounded end section. |
| 66. | Rounded end section. |
| 68. | Center section. |
| 70. | Ramped side. |
| 72. | Cartridge section. |
| 74. | End cap. |
| 76. | End cap. |
| 78. | Column. |
| 80. | Slot. |
| 82. | Sleeve. |
| 84. | Slot. |
| 86. | Cartridge snout. |
| 88. | Core. |
| 90. | Web. |
| 92. | Hub. |
| 94. | Axis. |
| 96. | Upstanding rib. |
| 98. | Upstanding rib. |
| 100. | Upstanding rib. |
| 102. | Upstanding rib. |
| 104. | Pin. |
| 106. | Pin. |

-continued

PARTS LIST FOR FIGURES

| Reference No. | Part |
|---|---|
| 108. | Radial slot. |
| 110. | Bayonet. |
| 112. | Bayonet. |
| 114. | Collar. |
| 118. | Flexible finger. |
| 120. | Letters. |
| 121. | Batched cartridges. |
| 122. | Envelope path. |
| 124. | Cartridge path. |
| 126. | Desplicing station. |
| 128. | Finishing station. |
| 130. | Cine processor. |
| 132. | Film preparation work station. |
| 134. | Service printer. |
| 136. | Index printer. |
| 138. | Ethernet connection. |
| 140. | SCSI connection. |
| 142. | Supply position. |
| 144. | Take-up position. |
| 146. | Spliced film roll. |
| 148. | Straight line path. |
| 150. | Reverse roll. |
| 152. | Metering roller. |
| 154. | Capstan. |
| 156. | Splice detector. |
| 158. | Film cleaner. |
| 160. | Electronic device (optical transducer). |
| 162. | Electronic device (magnetic transducer). |
| 164. | Electronic device (opto-electronic transducer). |
| 166. | Splice detector. |
| 168. | Drawer (magnetic media). |
| 169. | Reel. |
| 170. | Reel. |
| 172. | Paper roll. |
| 174. | Paper roll. |
| 176. | Paper processor. |
| 178. | Roll. |
| 180. | Roll. |
| 182. | Roll. |
| 184. | Inspection station. |
| 200. | Desplicing apparatus. |
| 212. | Film strip. |
| 214. | Film strip |
| 216. | Heating head. |
| 218. | Platen. |
| 222. | First drive. |
| 224. | Second drive. |
| 226. | Pick-up web. |
| 228. | Thermal adhesive. |
| 230. | Space. |
| 232. | Heating shoe. |
| 234. | Hot plate. |
| 242. | Pressure rod. |
| 244. | Air supply. |
| 246. | Sensor. |
| 248. | Sensor. |
| 250. | Sensor. |
| 252. | Drive. |
| 255. | Reattaching apparatus. |
| 256. | Slot. |
| 257. | Reattaching tool. |
| 258. | Tool features. |
| 259. | Finger. |
| 260. | Finger. |
| 262. | Finger. |
| 264. | Projection. |
| 266. | Drive shaft. |
| 270. | Path. |
| 272. | Package. |
| 274. | Billing. |

What is claimed is:

1. A method of processing photographic film strips provided in a plurality of cartridges; said method comprising the steps of:

removing the film strips from each of the plurality of cartridges with the film strips and cartridges intact, each removed film strip having a one-to-one relationship with the cartridge from which the film strip was removed;

splicing the intact film strips together, end-to-end, establishing a sequential order of the film strips;

maintaining the plurality of cartridges from which the film strips were removed in the same sequential order as the spliced film strips;

developing the spliced film strips into printable images;

desplicing the film strips with the despliced film strips intact;

matching each despliced film strip in the one-to-one relationship with the maintained cartridge from which the despliced film strip was removed; and, loading the matched film strips into the plurality of cartridges with each film strip in the same cartridge from which the film strip was originally removed.

2. A method of processing multiple strips of photographic film contained in a plurality of cartridges; said method comprising the steps of:

separating each of the film strips from a corresponding cartridge with the film strips intact;

splicing each of the separated film strips together, establishing an order of the film strips;

maintaining each of the corresponding cartridges from which the film strips were separated by loading said cartridges in a magazine in the same sequential order as the separated film strips;

developing the spliced film strips to produce printable images;

separating the spliced film strips from one another with the separated film strips intact and in said order; and, loading each film strip into the same corresponding cartridge from which each film strip was originally separated.

3. A method of handling multiple strips of photographic film provided in cartridges for development into printable images, each cartridge including an internal spool and each film strip having a trailing end coupled to each spool and a leading end opposite the trailing end; said method comprising the steps of:

separating each of the film strips from a corresponding cartridge and spool with the film strips and cartridges intact;

splicing the separated film strips together, with the trailing end of each film strip coupled to the leading end of another film strip, establishing an order of the film strips;

maintaining each of the cartridges from which each of the film strips were separated by loading the cartridges in a magazine in the same order as the spliced film strips;

developing the spliced film strips into printable images and printing the images onto photographic paper;

desplicing the film strips while maintaining the despliced film strips intact and in said order; and, loading each of the despliced film strips into the same cartridge from which each film strip was originally separated, trailing end first, and coupling the trailing end of each film strip to the spool of said same cartridge.

4. A method of printing optically recorded images from a plurality of film strips spliced together in a roll in a first order; said method comprising the steps of:

unwinding said spliced film strips from said roll;

scanning said unwound film strips in said first order to electronically capture image information from the optically recorded images;

rewinding said film strips onto said roll in a reversed second order opposite from said first order;

unwinding said film strips from said roll;

optically printing the recorded images on said film strips in said reversed second order; and, rewinding said film strips into said roll.

5. The invention of claim 4, wherein the film strips include magnetically recorded information representing conditions of exposure, said scanning step includes capturing electronically the magnetically recorded information, and including the step of maintaining a known relationship between the electronically captured information from the optically recorded image and the electronically captured magnetically recorded information.

6. The invention of claim 4, including the step of using the electronically captured image information from the optically recorded images to generate index prints, each index print including a plurality of said images printed in a small format on a single rectangular sheet.

7. A method of printing optically recorded images from a plurality of film strips spliced together in a roll in a first order, said film strips included camera recorded information representing exposure conditions associated with said images; said method comprising the steps of:

unwinding said spliced film strips from said roll;

scanning said film strips electronically to capture a) image information from the optically recorded images; and b) the camera recorded information representing exposure conditions;

rewinding said film strips onto said roll in a second order reversed from said first order;

unwinding said film strips from said reversed roll;

setting printing parameters according to said electronically scanned image information; and, optically printing the images from the film strips onto photographic paper.

8. The invention of claim 7 including the step of using the electronically captured information from the optically recorded images to generate index prints, each index print including a plurality of said images printed in a small format on a single rectangular sheet.

9. Apparatus for processing photographic film strips provided in a plurality of cartridges; said apparatus comprising:

means for removing each film strip from a corresponding cartridge with the film strips and cartridges remaining intact after removing;

means for splicing the intact film strips together, establishing a sequential order of the film strips;

means for developing the spliced film strips into printable images;

means for desplicing the intact film strips wherein the desplicing means leaves the despliced film strips intact; and means for loading each of the intact film strips into the corresponding cartridges from which each film strip was originally removed.

10. Apparatus for handling a plurality of film strips, each film strip including optically recorded images which are spliced together in a roll; said apparatus comprising:

means for unwinding said spliced film strips from said roll;

means for scanning said spliced film strips in a first order to electronically capture image information from the optically recorded images;

means for rewinding said spliced film strips onto said roll in a second order which is opposite to the first order;

means for unwinding said film strips from said roll means for optically printing the recorded images on said film strips in said reverse order; and means for rewinding said film strips into said roll.

* * * * *

IN THE UNITED STATES PATENT AND TRADEMARK OFFICE
CERTIFICATE OF CORRECTION

PATENT NO.: 5,473,402
DATED: December 5, 1995
INVENTOR(S): F. C. Long, et al It is certified that an error appears in the above-identified patent and that said Letters Patent is hereby corrected as shown below:

Column 15, Line 28, after "order, said film strips" delete "included" and insert ------including------

Signed and Sealed this

Fifteenth Day of October, 1996

*Attest:*

BRUCE LEHMAN

*Attesting Officer*   *Commissioner of Patents and Trademarks*